UNITED STATES PATENT OFFICE.

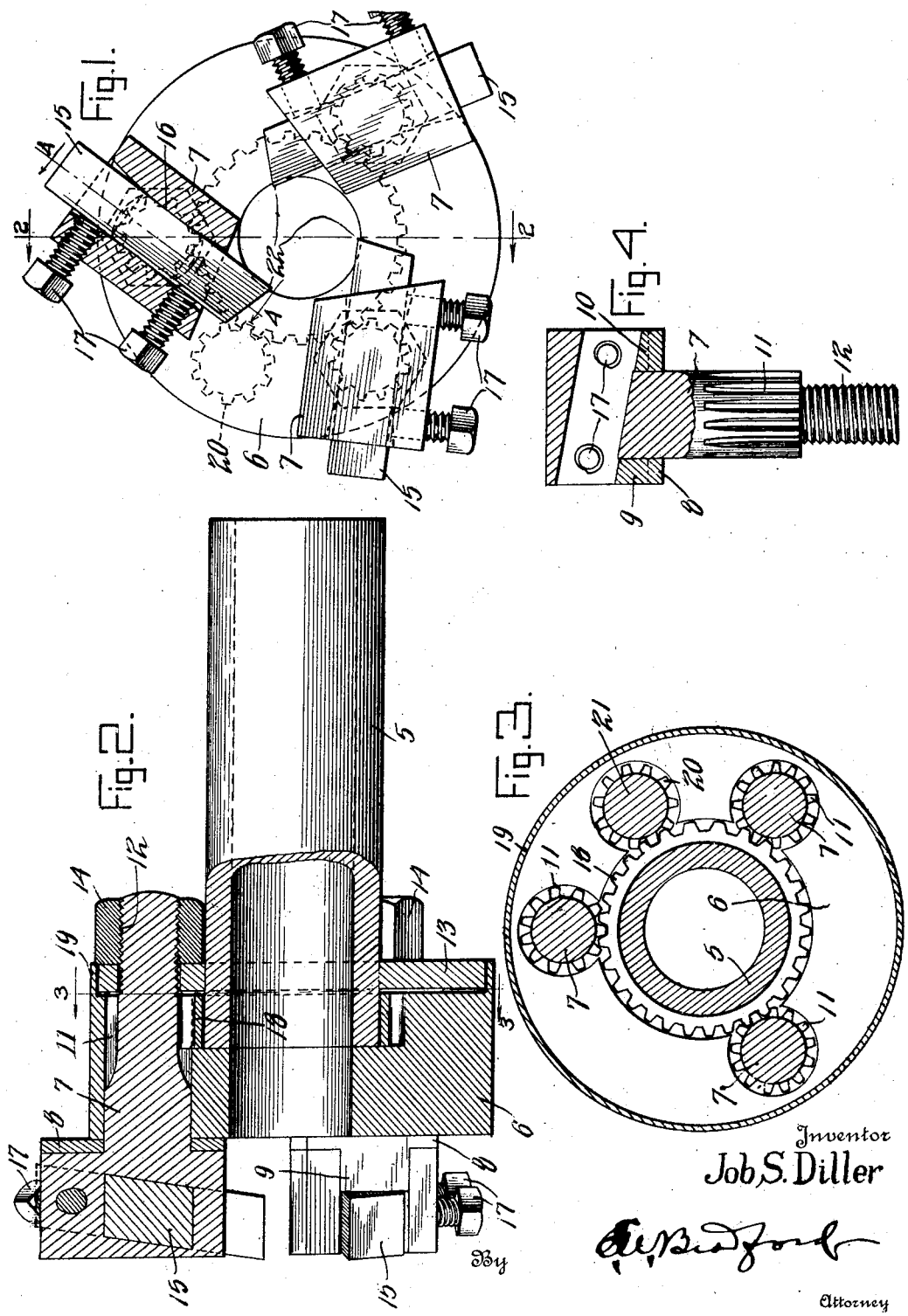

JOB S. DILLER, OF WAYNESBORO, PENNSYLVANIA.

CUTTER HEAD.

1,405,903.     Specification of Letters Patent.     Patented Feb. 7, 1922.

Application filed February 7, 1921. Serial No. 443,189.

*To all whom it may concern:*

Be it known that I, JOB S. DILLER, a citizen of the United States, residing at Waynesboro, in the county of Franklin and State of Pennsylvania, have invented certain new and useful Improvements in Cutter Heads, of which the following is a specification.

My said invention relates to a new and improved hollow milling tool and it is an object thereof to provide an adjustable cutting tool for acting on the exterior surface of a tube or rod.

A further object of my invention is to provide individual adjusting means for the blades of my cutting device as well as common adjusting means for adjusting all the cutters simultaneously.

Referring to the accompanying drawings which are made a part hereof and on which similar reference characters indicate similar parts, Figure 1 is an end view of my hollow milling device partly in section, Figure 2, a longitudinal section thereto, Figure 3, a transverse section on line 3—3 of Figure 2, and Figure 4, a detail of one of the tool holders.

In the drawings reference character 5 indicates a shank or sleeve which drives the device and which is hollow to permit the work to pass therethrough, the work being also driven in the contrary direction if desired. 6 indicates a head in which the tool holders 7 are mounted, this head being removably attached to one end of the sleeve. The tool holders 7 pass through openings in the body and are spaced therefrom by washers 8 having projections 9 and 10 extending toward the tool, each tool holder having a pinion 11 integral therewith and a threaded portion 12 at its rear end extending through a disk 13 on the sleeve. Nuts 14 on the threaded part of the tool holder serve to hold the parts together. At its forward end each tool holder has a transverse opening in which is located a tool 15, the tool resting at its under side on a rounded surface 16 of the opening and being adjustable thereon by means of set screws 17 which provide individual adjustment for the cutting tools and also serve to lock them in adjusted position. The tools 15 may be flat or grooved cutters or other devices adapted for use in a head such as herein disclosed.

For giving a common adjustment to the tool holders 7 I provide a gear 18 surrounding the sleeve 5 at its end and meshing with each of the pinions 11. This gear is surrounded by the head 6 which also has a flange 19 surrounding the disk 13. A pinion 20 on a shaft 21 meshes with the gear 18 and may extend rearwardly through the disk 13 and be provided with a squared head for engagement by a wrench.

To place the device in condition for operation the disk 13 and gear 18 are placed on the sleeve, the head 6 is placed in position as shown and the tool holders have their shanks passed through the body and the disk and the nuts 14 applied thereto. By tightening the nuts 14 the disk 13, gear 18 and head 6 may all be fastened rigidly together so that they all act as one piece. The set screws 17 are now adjusted, if necessary, to render the cutting edges 22 of the cutters equi-distant from the center of the opening. When it is desirable to adjust all of the cutters in or out the nuts 14 are loosened and the head on shaft 21 is turned thereby turning the gear 18 and each of the tool holders 7 as desired and after such adjustment is complete the nuts 14 are again tightened.

I do not limit myself to the precise construction shown and described, as modifications thereof falling within the scope of my invention as defined in the claims annexed hereto will occur to those skilled in the art.

Having thus fully described my said invention, what I claim as new and desire to secure by Letters Patent, is:

1. A machine tool comprising a shank, a head therefor, tool holders in the head, means for giving adjustment to the tool holders, and individual adjusting means for the tools whereby they may be rocked into various positions within the tool holders, substantially as set forth.

2. In a hollow milling tool a sleeve and a head therefor, tool holders rotatably mounted in the head, means common to the tool holders for rotating them to adjust the tool holders, a rounded surface on each tool holder against which a tool may rest, and individual means for adjusting the tools on such surface and locking them in adjusted position, substantially as set forth.

3. A hollow milling tool comprising a sleeve, a head therefor, tool holders on the head, said tool holders having apertures for edge tools, means at one side of such apertures providing rocking adjustment for such tools and means at the other side for locking the tools in adjusted position, substantially as set forth.

4. In a hollow machine tool, a rotary head, a tool holder thereon, an inwardly-facing tool mounted in said holder for rocking adjustment on an axis parallel to that of the head, substantially as set forth.

5. In a hollow machine tool, a rotary head, a tool holder thereon, tool-holders thereon adjustable on axes parallel to that of the head, and tools on the holders mounted to rock thereon, substantially as set forth.

6. In a hollow machine tool, a sleeve, a head therefor, tool holders in the head provided with means for holding tools in rocking relation thereto, pinions on the tool holders, a gear meshing with the pinions and surrounding the sleeve, and means whereby the gear may be rotated to adjust the tool holders, substantially as set forth.

7. In a hollow machine tool, a sleeve, a head therefor, tool holders in the head, common adjusting means for the tool holders, and means for locking them individually in adjusted position, substantially as set forth.

8. A hollow machine tool comprising a sleeve, a gear surrounding the sleeve, a disk adjacent the gear also surrounding the sleeve, a head bearing against an end of the sleeve and surrounding the gear and disk, tool holders in the head and a plurality of nuts for clamping the head, the gear, the disk and the individual tool holders together, substantially as set forth.

9. In a machine tool, a head, a tool holder rotatable therein and having a tranverse aperture to receive a cutting tool, and a washer between the head and the tool holder having extensions projecting into engaging relation with the tool, substantially as set forth.

10. In a machine tool, a head, a tool holder rotatable therein and having an aperture to receive a cutting tool, and means for securing the tool in the tool holder by the driving of the tool holder against the head, substantially as set forth.

11. In a machine tool, a head, a tool holder rotatable therein and having an aperture to receive a cutting tool, means for securing the tool in the tool holder by the driving of the tool holder against the head and other means for adjusting the tool in the tool holder without moving the tool holder, substantially as set forth.

12. In a machine tool, a head, a tool holder rotatable therein and having a transverse aperture to receive a cutting tool, a washer between the head and the tool holder having extensions projecting into engaging relation with the tool, said extension adapted to bear against the tool and secure the same within the said aperture by the driving of the tool holder against the head, substantially as set forth.

13. In a machine tool, a head, a tool holder rotatable therein and having a transverse aperture to receive a cutting tool, a washer between the head and the tool holder having extensions projecting into engaging relation with the tool, said extension adapted to bear against the tool and secure the same within the said aperture by the driving of the tool holder against the head, and means for adjusting the tool in the tool holder independently of any movement of the tool holder, substantially as set forth.

In witness whereof, I have hereunto set my hand and seal at Waynesboro, Pennsylvania this 21st day of January, A. D. nineteen hundred and twenty-one.

JOB S. DILLER. [L. S.]

Witnesses:
ROY E. FRIEDLY,
JOHN A. POTTER.